United States Patent

[11] 3,574,452

[72] Inventors Stuart Louis McLendon
5802 E. 30th St., 85711;
Joseph Robert Hanson, 2573 E. Alto Vista, Tucson, Ariz. 85716
[21] Appl. No. 821,619
[22] Filed May 5, 1969
[45] Patented Apr. 13, 1971

[54] BREAKAWAY TEMPLE HINGE MOUNTING FOR SPECTACLE FRAME
5 Claims, 3 Drawing Figs.
[52] U.S. Cl. .................................................. 351/153, 351/116
[51] Int. Cl. .................................................. G02c 5/14, G02c 5/22
[50] Field of Search .......................................... 351/153, 52, 116, 149; 16/128; 24/231

[56] References Cited
UNITED STATES PATENTS
| 2,555,578 | 6/1951 | Davis ........................... | 351/52 |
| 3,422,449 | 1/1969 | Rinnman ...................... | 351/121 |
| 3,476,466 | 11/1969 | Hopkins ....................... | 351/153 |

Primary Examiner—David Schonberg
Assistant Examiner—Robert L. Sherman
Attorney—Jones and Lockwood ABSTRACT: The subject invention relates to a breakaway hinge mounting for spectacles which permits the temple piece to break away from the lens frame under an impact. The hinge includes a side leaf rigidly secured to the temple piece, a front leaf pivotally secured to the side leaf, a gripper rigidly secured to the front leaf and a securing member embedded in the lens frame for engaging the gripper, thereby preventing rotation of the temple member and permitting the temple piece to break away from the lens frame when the spectacle hinge is subjected to an external force.

INVENTORS
JOSEPH R. HANSON
STUART L. McLENDON

BY Beall and Jones

ATTORNEYS

BREAKAWAY TEMPLE HINGE MOUNTING FOR SPECTACLE FRAME

BACKGROUND OF THE INVENTION

This invention relates to a breakaway hinge for spectacles which will allow a temple piece to disengage from a lens frame upon impact from an external force and, which will at the same time prevent the temple piece from rotating when the temple piece and the lens frame are engaged.

While quick-disconnect hinges for spectacles are known in the prior art, they are primarily designed to allow removal of the temple member after breakage has occurred or to facilitate assembly; however, they are not designed to prevent breakage of the temple member when the spectacles receive an impact blow, or when the temple is bent or twisted in the wrong direction. Breakage occurs in the spectacle frames presently in use when the frames are subjected to such forces primarily because the two leaves of the usual hinge are rigidly attached to the temple member and the lens frame, respectively, and held together by a screw. The arrangement is generally such that the hinge permits the temple piece to fold against the lens frame and to be extended to a position approximately perpendicular to the frame, but no provision is made to permit the hinge joint to yield when an external force is applied in a direction other than that of the folding and unfolding forces. Although a certain amount of rigidity is necessary in spectacle frame joints to maintain the proper alignment of the lens with respect to the wearer's eyes and to keep the temple pieces against the wearer's head, this rigidity requirement is not so great that the temple piece should break before the joint gives away. Therefore, it is only necessary to maintain enough rigidity in the hinge to allow the temple piece to put a predetermined amount of pressure against the wearer's head to hold the spectacle frames firmly in place.

SUMMARY OF THE INVENTION

It is, therefore, an object of this invention to provide a spectacle frame which will maintain proper alignment during normal wear but will allow separation of the lens frame and temple pieces when the spectacles are subjected to an unusual force, strain or blow which would otherwise result in breakage.

Another object of this invention is to provide a spectacle frame which can be assembled without tools or the need for any technical knowledge, and which, when separated, can easily be reassembled.

Still another object of this invention is to provide a easily detachable temple member which can be replaced if the fitting or size is improper, or if it is desired to change the style or appearance of the spectacles.

These and other objects are accomplished by the present invention through the use of a spectacle frame having a lens frame and a pair of temple members secured to the lens frame, in combination with a breakaway hinge which will permit separation of the frame and the temple when the hinge is over stressed. The hinge includes a side leaf secured to the temple member, a front leaf secured to the side leaf, a screw or pin for securing the leaves together while allowing them to pivot, a gripper secured to the forward face of the front leaf and a securing member carried on the lens frame for engaging the gripper.

BRIEF DESCRIPTION OF THE DRAWINGS

The foregoing and additional objects, features and advantages of the invention will be apparent to those skilled in the art from the following detailed description of a preferred embodiment thereof, taken with the accompanying drawings, in which.

DESCRIPTION OF A PREFERRED EMBODIMENT

Figure 1:
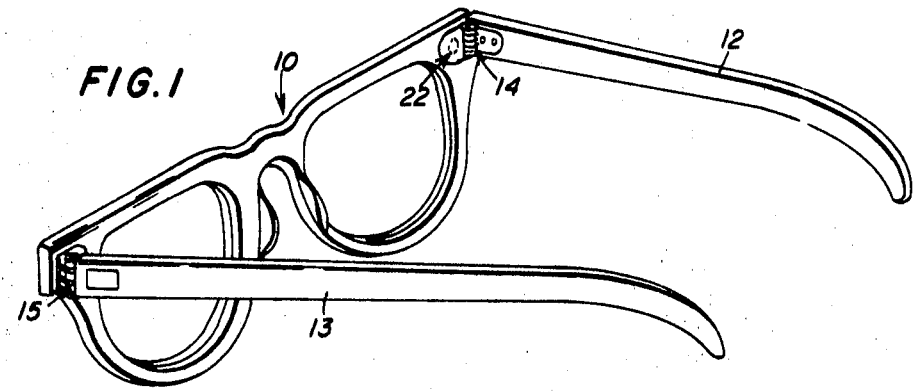
FIG. 1 is a perspective of a typical spectacle frame showing the mounting of the present invention.

Referring more particularly to the drawings, in FIG. 1 the numeral 10 illustrates a lens frame with a pair of temple members 12 and 13 pivotally attached thereto by a pair of hinges 14 and 15, each of which is constructed in accordance with my invention, to form spectacles having breakaway temple pieces.

Figure 2:
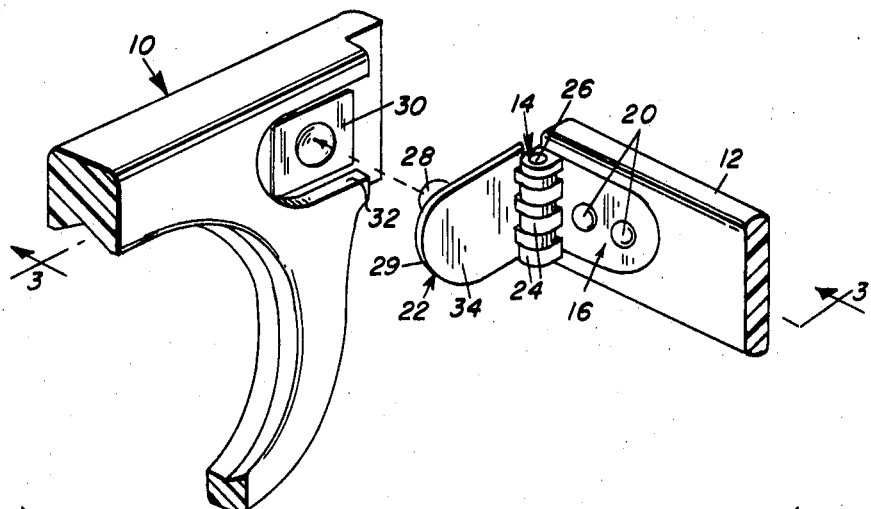
FIG. 2 is an enlarged exploded perspective view showing one embodiment of a hinge made in accordance with the present invention.
Figure 3:
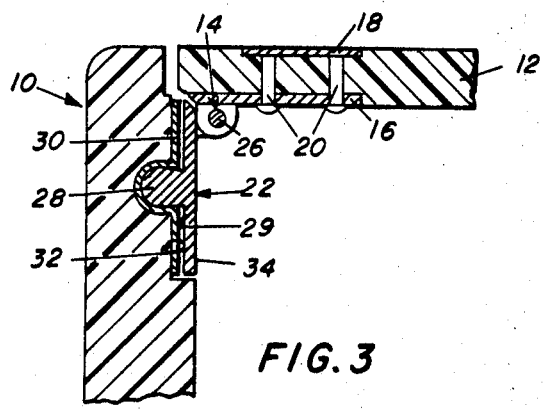
FIG. 3 is a cross-sectional view taken on line 3—3 of FIG. 2, showing the hinge of the embodiment of FIG. 2.

FIGS. 2 and 3 illustrate in more detail the hinge 14. The temple member 12 has a side leaf 16 rigidly secured thereto, the preferred being a hinge plate 18 carrying a pair of rivets 20 which will extend through the temple member 12 and side leaf 16. The side leaf 16 is secured to a front leaf 22 through interlocking lugs on each leaf which will receive a screw or pin 26, in conventional manner. A gripper 28, which in the preferred embodiment illustrated herein is a snap fastener ball, which is secured to the forward face 29 of the front leaf 22. A securing member 30, or more particularly in this embodiment a snap fastener plate, is carried within a slot or recess 32 formed in the lens frame 10, and will engage the gripper 28.

The slot portion 32 in the lens frame is shaped to correspond to the outline of the front leaf and is deep enough so that the rear face 34 of the front leaf is flush with the surface of the lens frame 10. This allows the front leaf of the hinge to be firmly seated in the lens frame, thereby preventing the temple member 12 from rotating when the gripper 28 is engaged by the securing member 30 thereby providing enough rigidity to keep the spectacle frames in alignment while in normal use.

It can be seen from the above description and drawings that the breakaway hinge construction provides a hinge rigid enough to prevent rotation of the temple piece with respect to the lens frame during normal use, thereby permitting the spectacles to be fitted for proper alignment in the normal manner. In addition, the hinge construction provides the breakaway effect which will prevent breakage of the temple piece when the spectacles receive a blow or unusual stress from any direction. By the same token, the temple piece can easily be removed from the lens frame by a sharp twist or flexing of the spectacles, allowing a new temple piece to be snapped into place without the necessity of using any tools. Changing the style of the spectacles can easily be accomplished by breaking away the original temple piece and replacing it with a temple piece of the desired style.

The described embodiment can be modified in numerous ways, as will be apparent from the foregoing. For example, it is within the skill of the art to vary the type of connecting mechanism by replacing the gripper illustrated herein with strong magnets to hold the lens frame and temple pieces together as long as proper alignment of the lens frame and temple piece is maintained. Alternatively, a friction detent type connection can be used where the force to overcome the friction is less than the force required to break the temple piece. It is also within the skill of the art to reverse the gripper and securing member, placing the gripper in the lens frame and placing the securing member on the front leaf of the hinge. Another modification would be to secure the front leaf of the hinge rigidly to the lens frame, providing the breakaway connection between the side leaf and the temple piece. These and other variations and changes can be made in the invention as above described and illustrated without departing from the true spirit and scope thereof as defined in the following claims.

I claim:

1. A spectacle frame comprising, in combination, a lens frame, a pair of temple pieces, and a breakaway hinge for connecting said temple pieces to said lens frame for allowing either of said temple pieces to become disengaged from said lens frame when subjected to a predetermined stress which would cause breakage of the temple piece, wherein said breakaway hinge includes a first and a second leaf pivotally connected, first means for attaching said first leaf to said temple piece, and second means for attaching said second leaf to said lens frame, wherein one of said means for attaching said leaves will break away under a predetermined stress.

2. The spectacle frame of claim 1, wherein said breakaway hinge includes a gripper means secured to one of said leaves and a securing member means carried on said spectacle frame.

3. The spectacle frame of claim 2, further including a recess in said spectacle frame for receiving the leaf carrying said gripper means thereby preventing said temple piece from rotating.

4. The spectacle frame of claim 2, wherein said gripper means and said securing member means comprise a snap fastener ball and a snap fastener plate, respectively.

5. The spectacle of claim 2, wherein the gripper means is secured to said second leaf and the securing member means is carried on said lens frame.